United States Patent [19]

Oishi et al.

[11] Patent Number: 4,767,007
[45] Date of Patent: Aug. 30, 1988

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 87,738

[22] Filed: Aug. 21, 1987

[30] Foreign Application Priority Data

Aug. 21, 1986 [JP] Japan .................... 61-127305[U]

[51] Int. Cl.$^4$ ............................................ B65D 85/672
[52] U.S. Cl. ................................. 206/387; 206/389; 206/524.3; 264/257; 360/132
[58] Field of Search ............... 206/387, 389, 408, 397, 206/524.3; 242/197, 199, 200; 264/119, 122, 126, 220, 271.1, 243, 257; 273/326; 360/132; 428/35, 224, 286, 290, 296

[56] References Cited

U.S. PATENT DOCUMENTS

| 4,186,235 | 1/1980 | Bramwell | 428/296 |
| 4,511,148 | 4/1985 | Amos et al. | 273/326 |
| 4,613,535 | 9/1986 | Harpell | 428/286 |
| 4,663,225 | 5/1987 | Farley | 264/126 |

FOREIGN PATENT DOCUMENTS

| 0063403 | 10/1982 | European Pat. Off. | 428/297 |
| 2828940 | 2/1979 | Fed. Rep. of Germany | 360/132 |

OTHER PUBLICATIONS

"T300: The Cassette Designed for Data" Information Terminals, advert., six pages, 2-1972.

Primary Examiner—Jimmy G. Foster
Attorney, Agent, or Firm—Sughrue, Mion, Zinn, Macpeak, and Seas

[57] ABSTRACT

A magnetic tape cassette having a magnetic tape, a pair of reel hubs and a cassette body for rotatably retaining the pair of reel hubs around which the magnetic tape is wound. A protective layer fabricated of a nonwoven fabric is formed unitedly connected to the surface of the cassette body. The cassette body is fabricated of a plastic material or the like by injection molding. The protective layer is formed by disposing a nonwoven fabric in a cavity of an injection mold at the time the injection molding is to be conducted, and subsequently, unitedly connecting the nonwoven fabric to the cassette body simultaneously with the injection molding of the cassette body. The nonwoven fabric should preferably have an antistatic effect. Since the protective layer is fabricated of a nonwoven fabric, the cassette can be provided with a protective layer covering the entire outer surface of the cassette body and improve its shock fracture strength, therefore it becomes hard to damage the cassette. Further, since the nonwoven fabric has an antistatic effect, it is possible to prevent the cassette body from being electrically charged, and therefore efficiently prevent dust adhering to the cassette body.

2 Claims, 1 Drawing Sheet

MAGNETIC TAPE CASSETTE

BACKGROUND OF THE INVENTION

1. Field of the Invention

This invention relates to a magnetic tape cassette, and more particularly to a magnetic tape cassette comprising a cassette body having high shock fracture strength.

2. Description of the Prior Art

A magnetic tape cassette comprises a pair of reel hubs around which a magnetic tape is wound retained in a cassette body. In general, the cassette body is fabricated of a plastic material or the like by injection molding and the manufacture and the mass production thereof are easy. The cassette bodies manufactured according to the conventional methods, however, have a drawback of possessing relatively low shock fracture strength owing to the properties of plastic materials and are prone to damage when, for example, the cassettes happen to drop to the floor. Especially when a material of the polystyrene series or the like is used for improving the heat resistance of the cassette body to equip it for outdoor use, the shock fracture strength thereof is low and the cassette body is likely to be damaged by the aforesaid accidental drop. Further, the cassettes manufactured according to the conventional methods have another drawback that the surfaces thereof are likely to become dusty, since plastic material has high electric resistance and, therefore is likely to become electrically charged.

In view of the drawbacks, the present applicant proposed a cassette body wherein a protective film layer is formed on the surface of the cassette body by disposing a film of polyethylene or the like in a cavity of an injection mold at the time injection molding is to be conducted and unitedly connecting the film to the surface of the cassette body simultaneously with the injection molding. Since the cassette body thus manufactured is provided with a protective film layer, the cassette body has an improved shock fracture strength, but is still disadvantageous in that it is difficult to form the protective layer over the entire outer surface of the cassette body for reasons relating to the formability of polyethylene film or the like. In addition, polyethylene or the like is also likely to be electrically charged and, it is therefore necessary to provide an antistatic layer on the surface of the polyethylene film or the like.

SUMMARY OF THE INVENTION

In view of the foregoing observations and description, the primary object of the present invention is to provide a magnetic tape cassette fabricated of a plastic material or the like by injection molding wherein the cassette body thereof has high shock fracture strength and is hard to damage even when the cassette happens to be dropped.

The magnetic tape cassette in accordance with the present invention, comprising a pair of reel hubs around which a magnetic tape is wound rotatably retained within a cassette body, is characterized in that the cassette body thereof is fabricated by injection molding and a protective layer fabricated of a nonwoven fabric is formed on the surface of the cassette body by disposing the nonwoven fabric in a cavity of an injection mold prior to the injection molding, and subsequently unitedly connecting the nonwoven fabric to the surface of the cassette body simultaneously with the injection molding of the cassette body. The nonwoven fabric constituting the protective layer should preferably be a nonwoven fabric which has an antistatic effect, for example, an electrically-conductive nonwoven fabric including carbon fibers or the like, according to the present invention.

In the magnetic tape cassette in accordance with the present invention, the cassette body of the cassette is fabricated of a plastic material or the like by injection molding and the protective layer fabricated of a nonwoven fabric is formed unitedly connected to the surface of the cassette body, simultaneously with the injection molding of the cassette body. Therefore, it is possible to easily manufacture a cassette body having a protective layer on the surface thereof. Also, since the formability of a nonwoven fabric is good, it is possible to form the protective layer covering the entire outer surface of the cassette body easily. Further, since the protective layer fabricated of a nonwoven fabric is provided, the cassette body of the magnetic tape cassette in accordance with the present invention has improved shock fracture strength, therefore the cassette becomes unlikely to be damaged even when the cassette happens to drop to the floor or the like. In addition, the surface of the cassette body can be prevented from being electrically charged, and becomes less likely to become dusty, by employing as the protective layer a nonwoven fabric which has good electrical conductivity.

DESCRIPTION OF THE PREFERRED EMBODIMENTS

The present invention will hereinbelow be described in further detail with reference to the embodiments thereof as shown in the accompanying drawings.

Figure 1:
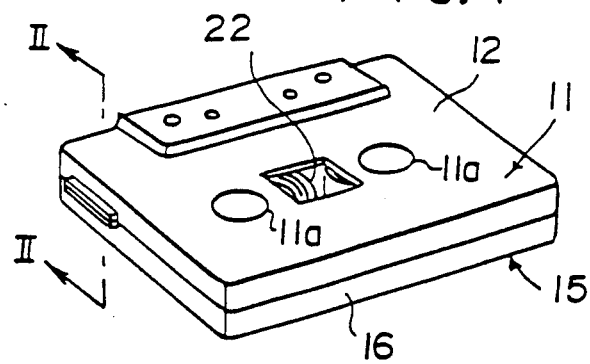
FIG. 1 is a perspective view showing the magnetic tape cassette in accordance with the present invention.
Figure 2:
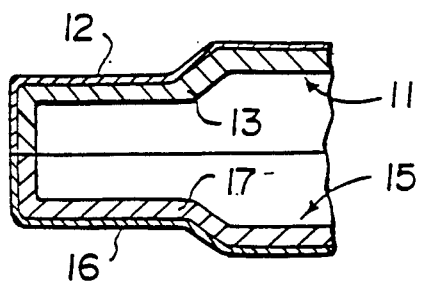
FIG. 2 is a cross-sectional view of the magnetic tape cassette taken along line II—II of FIG. 1.

Referring to FIG. 1, the magnetic tape cassette in accordance with the present invention comprises a cassette body consisting of an upper half 11 and a lower half 15, a pair of reel hubs rotatably retained in a pair of hub portions 11a, 11a, and 15a, 15a defined in the cassette body (the hub portions 15a, 15a of the lower half 15 are not shown) and a magnetic tape 22 wound around the reel hubs. The upper half 11 and the lower half 15 are fabricated separately by injection molding. As shown in FIG. 2, each half 11, 15 is constituted by a base body 13, 17 fabricated of an injection molding material such as plastic or the like and a protective layer 12, 16 covering the surface of the base body 13, 17.

The protective layer 12, 16 is formed simultaneously with the injection molding of each half 11, 15. The method of forming the protective layer 12, 16 will now be described below.

Figure 3:
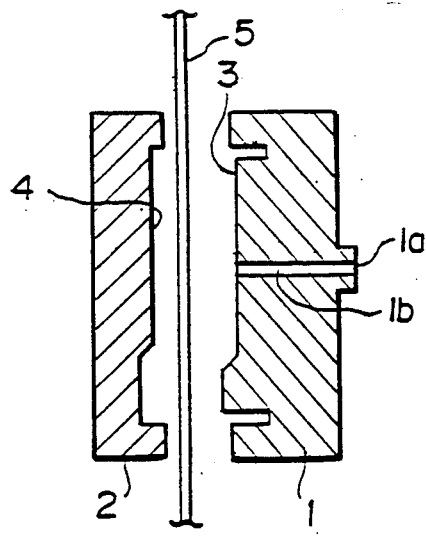
FIG. 3 is a cross-sectional view showing an injection mold which is employed in injection molding of the cassette body of the magnetic tape cassette.

The method of forming the cassette body, which is carried out by use of injection molds 1, 2 as shown in FIG. 3, will now be described below with reference to the injection molding of the upper half 11, by way of example. First of all, a nonwoven fabric 5 for constituting a protective layer 12 is inserted in a cavity between the injection molds 1 and 2, as shown in FIG. 3. The nonwoven fabric 5 employed in the cassette body in accordance with the present invention preferably includes an electrically-conductive material such as carbon fibers or the like. The nonwoven fabric 5 is sandwiched between the injection molds 1 and 2 so that the inner surface thereof opposes the injection mold 1 having a gate 1a. Then the injection molding material is injected from the gate 1a through the sprue 1b into the cavity formed by the recesses 3, 4. In this manner the injection molding material fills the cavity formed by the recesses 3, 4 with the nonwoven fabric 5 abutting against the bottom of the recess 4 of the mold half 2. At this time, the injection molding material contacts the surface of the nonwoven fabric 5, and the nonwoven fabric is connected to the surface of the molded base body 13 which has been fabricated of the solidified injection material, thereby forming a protective layer. Since a nonwoven fabric is made of physically entangled fibers, the nonwoven fabric easily conforms to the shapes of the surfaces of the recesses 3 and 4, and has excellent formability, even in case the shapes of the recesses 3, 4 are complicated or deep. For this reason, the nonwoven fabric is suitable for forming a protective layer 12 over the entire outer surface of the cassette body.

According to the method as mentioned above, it is possible to easily manufacture a cassette body having a protective layer 12 on the surface thereof by injection molding. In particular, it is possible to form a protective layer 12 covering the entire outer surface of the cassette body by use of a nonwoven fabric 5 which has a good formability and is easily deformable. Further, if a nonwoven fabric including carbon fibers or the like which has good electrical conductivity is employed as a nonwoven fabric 5, since the protective layer 12 itself has an antistatic effect, the surface of the cassette body becomes less likely to become dusty.

We claim:

1. A magnetic tape cassette comprising a magnetic tape, a pair of reel hubs and a cassette body for rotatably retaining said pair of reel hubs around which said magnetic tape is wound, wherein said cassette body is fabricated of a plastic material or the like by injection molding and a protective layer fabricated of a non-woven fabric is formed on the surface of said cassette body by disposing said non-woven fabric in a cavity of an injection mold at the time said injection molding is to be conducted, and subsequently, unitedly connecting said non-woven fabric to said surface of the cassette body simultaneously with said injection molding of the cassette body, wherein said non-waven fabric comprises a non-woven fabric which has an antistatic effect.

2. A method of forming a cassette body having a protective layer comprising the steps of:

disposing a non-woven fabric in a cavity of an injection mold; and injecting an injection molding material into said cavity of said injection mold such that said non-woven fabric adheres to a surface of said cassette body, to form a protective layer on the surface of said cassette body wherein said non-woven fabric comprises a non-woven fabric which has an anti-static effect.

* * * * *